Feb. 23, 1965 H. MULCH ETAL 3,171,006
REVERSIBLE CONTROL SWITCH FOR A SLIDE PROJECTOR
HAVING A SLIDE POSITION INDICATOR
Filed Sept. 21, 1961

INVENTORS
HANS MULCH
WALTER JUNG
HERIBERT LUSSEM
By Toulmin & Toulmin
Attorneys

United States Patent Office 3,171,006
Patented Feb. 23, 1965

3,171,006
REVERSIBLE CONTROL SWITCH FOR A SLIDE PROJECTOR HAVING A SLIDE POSITION INDICATOR
Hans Mulch, Walter Jung, and Heribert Lussem, Wetzlar (Lahn), Germany, assignors to Ernst Leitz Gesellschaft mit beschrankter Haftung, Wetzlar (Lahn), Germany
Filed Sept. 21, 1961, Ser. No. 140,187
Claims priority, application Germany, Sept. 23, 1960, L 37,100
8 Claims. (Cl. 200—167)

The present invention relates to a control switch for actuating a slide projector, more particularly, to a control switch which is remotely located from the slide projector but connected thereto by cable and which control switch has a counter therein so as to indicate at all times with respect to the slide magazine the slide which is being projected.

The conventional slide projector has inserted therein a slide magazine from which slides are moved to the projecting position in the projector and returned to the slide magazine by means of a slide changing mechanism. The actuation of the slide changing mechanism also effects a necessary advance of the slide mechanism so as to present the next slide for projection. The actuation of the slide changing mechanism is generally accomplished by an electric control switch which is either mounted on the slide projector itself or in a control switch box which is remotely located from the projector but connected thereto by a cable. The use of such a cable-connected control box allows for greater freedom in positioning the projector and in the location of the operator of the projector.

A disadvantage of such slide projectors, however, is that it is difficult and virtually impossible to ascertain the relative position of the slide magazine in the projector. That is to say, no opportunity is available to ascertain which slide in the slide magazine is being acted upon by the slide changing mechanism. This disadvantage exists because of the general construction of slide projectors wherein the slide magazine is concealed by the slide projector structure when the slide magazine is in the guideway of the projector.

It is extremely desirable to be able to quickly ascertain the relative position of the slide magazine since this will enable the operator to quickly determine the remaining number of slides in the slide magazine to be projected or to determine the moment when the last slide in the magazine is being projected. The operator will then be in a position to make necessary preparations in sufficient time for introducing a new slide magazine without an undue delay of time between magazines.

In addition, by numbering the slide compartments of the slide magazine the operator can readily correlate the projection of a slide with notes or explanatory material which it is desired to present concurrently with the projection of a particular slide. Ascertaining the position of the slide magazine is particularly desirable in those slide magazines wherein the magazine can be moved forwardly and in reverse and can be moved a distance greater than one slide compartment. Even if the slide magazine is numbered, it is difficult for the operator to ascertain the relative position of the slide magazine when he is remotely located from the projector and controls the projector by means of a cable-connected control box.

It is therefore the principal object of this invention to provide a novel and improved control box which is remotely located from a slide projector and connected thereto by a cable.

It is a further object of this invention to provide a remotely located control box for slide projectors wherein the control box contains indicating means for indicating to the operator at all times the relative position of the slide magazine in the projector.

The present invention, which achieves the above objects, essentially comprises a remote control switch box wherein the operating lever for the slide changing mechanism is constructed to simultaneously act as the operating means for a counter. Thus, each operation of the operating lever is registered by the counter and the scale of the counter is visible through a window in the control box. The counter comprises a gear wheel which is rotated one step by a pawl member which is pivotally mounted on the operating lever for the slide changing mechanism.

The operating lever for the slide changing mechanism can also serve simultaneously for selecting the direction of movement of the slide magazine. In this event, the control lever has a central normal position and is movable to two operating positions on either side of the central position. The operating member is then provided with two oppositely acting pawls which are cammed in such a manner that the proper pawl is engaged with the ratchet gear of the counter to move the counter in the corresponding direction.

Instead of the ratchet mechanism it is possible to use a control wheel which has a plurality of teeth on its periphery. The gear wheel is moved by hand and the teeth thereof coact with movable contact arms for operating the slide changing mechanism. A numbered dial is mounted on the gear wheel and hence moves concurrently therewith.

To facilitate reading of the scale visible in the viewing window of the casing illuminating means may be provided or the numbers may be made from luminescent material. Further, a cylindrical lens may be provided in the viewing window.

Other objects and advantages of this invention will be apparent upon reference to the accompanying description when taken in conjunction with the following drawings, wherein FIGURE 1 shows a horizontal, longitudinal sectional view of a remote control switch box having a ratchet mechanism for actuating a counter;

Figure 3:
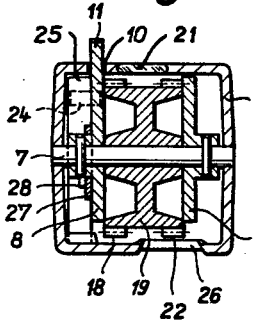
FIGURE 3 is a transverse sectional view, taken along the line A—A of FIGURE 1.
Figure 1:
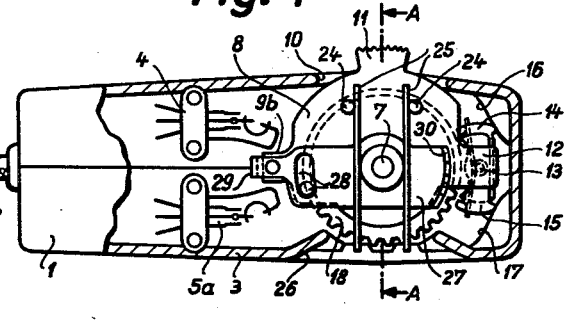
Figure 2:
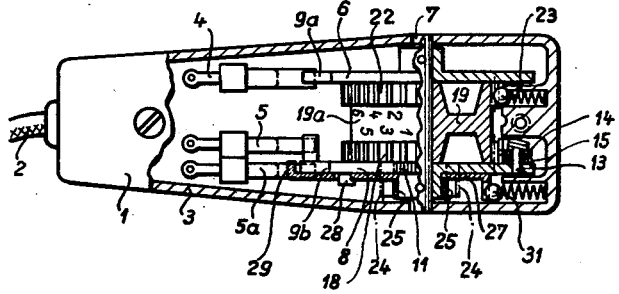
FIGURE 2 is a vertical, longitudinal sectional view of the control box of FIGURE 1.
Figure 4:
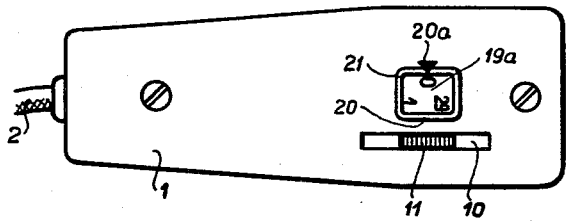
FIGURE 4 is a top plan view of the remote control switch box illustrated in FIGURES 1, 2 and 3.

Proceeding now to the drawings wherein like reference symbols indicate the same parts throughout the various views, there is illustrated in FIGURE 1 a remote control switch 1 which is connected to a slide projector by a cable 2. The control switch comprises a casing 3 within which are mounted two pairs of electrical circuit contacts 4 and 5. These contacts are connected with the electrical control system for operating the slide changing mechanism and the mechanism for advancing the slide magazine. The contacts 5 are in the electrical circuit for reverse movement of the slide magazine and the contacts 4 are in the electrical circuit for the forward movement of the slide magazine.

The contacts 4 and 5 are actuated by switching elements 6 and 8 which are fixedly mounted on a shaft 7 rotatably mounted in the casing 3. The switching element 6 has a tongue or projection 9a which is engageable with the contacts 4 and the switching element 8 has a tongue or projection 9b which is engageable with the contacts 5.

In the top surface of the casing 3 there is an opening 10 through which projects an operating lever 11 which is fixedly mounted to the switching element 8. On the switching element 8 there is an arm 12 which is diametrically opposite the tongue 9b. A bolt 13 is mounted on the arm 12 and spring-biassed pawls 14 and 15 are mounted on the bolt 13. The pawl 14 is engageable with a cam surface 16 and the pawl 15 is engageable with a cam surface 17. Both of the pawls 14 and 15 can engage the gear teeth of a gear 18 which is also rotatably mounted on the shaft 7 and is constructed integrally with a cylindrical drum 19. A numerical scale 19a is arranged on the outer surface of the drum 19 and is so positioned that one number at a time can be read through a viewing window 20. There is a stationary index 20a on one side of the viewing window which indicates the number to be read. The viewing window 20 is covered by a cylindrical lens 21.

The drum 19 is provided with additional gearing, indicated at 22, and which is engageable with a spring-biassed ball detent 23 which serves as a positioning member for the drum 19.

The switch element 8 is provided with laterally extending pins 24 which are engageable with leaf springs 25 and function to return the switching element 8 to its initial position after movement from its central position, as illustrated in FIGURE 1. There is an opening 26 in the bottom of the casing 3 through which the gear 22 is accessible for manual adjustment for resetting to zero.

A lever 27 is pivotally mounted on the shaft 7 and is provided with a slot 28 which receives a pin 28a to connect the lever 27 with the switch element 8. The lever 27 comprises a projecting shoulder 29 which is positioned beside the tongue 9b and actuates the pair of contacts 5a. The other end of the lever 27 is provided with openings 30 which are engageable with a spring-biassed ball detent 31 in order to stop the lever 27 in a particular position.

Bearing in mind the above description of the construction of the embodiment of the invention, illustrated in FIGURES 1 through 4, the operation of this control switch will next be described.

When the slide magazine containing the slides which are to be projected is inserted into the projector, and the slide or slide compartment which is designated as number 1 is positioned to be acted upon by the slide changing mechanism, the counter device is set to zero. Resetting to zero is accomplished by manually moving the gear 22 which is accessible through the opening 26. The gear 22 is maintained in its adjusted position by the resilient detent 31.

In order to move the slide magazine in the forward direction, the operating handle 11 is pivoted to the right, as viewed in FIGURE 1. This will cause the tongue 9a to close the contacts 4. The closing of these contacts will start the motor in the projector and will also energize the control circuit for actuating the slide changing mechanism and for advancing the slide magazine. When this operation is started and the above-described functions pertaining to the change of slides occurs automatically, the lever 11 is released. The lever 11 then swings back to its normal central position, as viewed in FIGURE 1, under the action of one of the leaf springs 25.

The pivoting movement of the operating lever 11 also causes a pivoting of the arm 12. This causes the pawl 15 to slide against the cam curve 17 so that the contact point of the pawl 15 engages the gear teeth of the gear 18. The cam surface 17 is so constructed that the cam engages the gear 18 sufficiently long only to move the gear by one gear tooth. This causes a movement of the drum 19 and the next-successive number in the scale 19a will appear in the viewing window 20.

The pawl 14 will also move since it is attached to the arm 12. However, since the pawl 14 is not in contact with its cam surface, this pawl will not engage the gear 18. Both pawls 14 and 15 will return to their original positions as illustrated in FIGURE 1 by the action of their return springs after the operating handle 11 has been released.

Moving the slide magazine in the reverse direction is accomplished in a similar manner as described above in connection with moving the slide magazine in a forward direction. For reverse movement of the slide magazine the operating handle 11 is pivoted to the left as viewed in FIGURE 1. This causes the pawl 14 to engage the gear 18 through the action of the cam surface 16. This will rotate the gear 18 in the reverse direction by one step or gear tooth. While this action of rotating the gear 18 is similar, the process differs in the closing of the contacts.

In order to reverse the movement of the slide magazine in the projection, an electromagnet or some other electrically controlled element is generally provided. This electromagnet must be energized for a certain period of time and in the present invention this is accomplished by the switching arrangement 27 through 30 together with the switch 5a as illustrated in the drawings.

When the operating handle 11 is pivoted to the left to move the slide magazine in the reverse direction, the contacts 5 are closed to actuate the slide changing mechanism and the contacts 5a are also closed under the action of the protruding shoulder 19 from the pivoted lever 27. The detent 31 will retain the pivoted member 27 in its pivoted position when the operating handle 11 has been released and the switch elements 6 and 8 return to their original positions under the action of the leaf springs 25.

Should the operating handle 11 be again moved to the left in order to obtain a reverse movement of the slide magazine, the lever 27 will retain its position since the pin slot arrangemet 28 provides sufficient play. Only when the operating handle 11 is pivoted to the right will the lever 27 be returned from its operating position into its original position, as shown in FIGURE 1.

Figure 5:
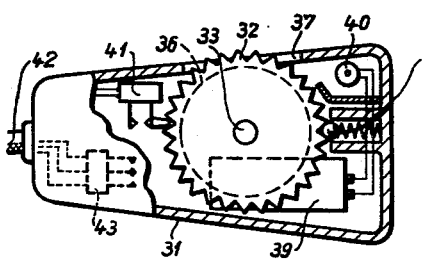
FIGURE 5 is a longitudinal sectional view of a modification of the remote control switch box wherein the gear wheel for actuating the slide changing mechanism also functions as a counting device.
Figure 6:
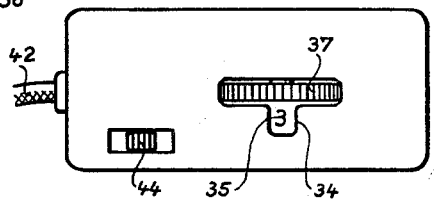
FIGURE 6 is a top plan view of the control switch box illustrated in FIGURE 5.

A modification of the control switch box of this invention is illustrated in FIGURES 5 and 6, wherein the control box comprises a casing 31 in which a gear wheel 32 having a serrated periphery is rotatably mounted on a shaft 33. A registering cylinder 36 is fixedly connected with the gear wheel 32 and has a plurality of indicating numbers 35 thereon which numbers are coordinated to the teeth of the gear wheel 32. These numbers are visible through a viewing window 34 in the casing 31. The casing is also provided with an opening 37 through which the gear wheel projects so that it can be manually operated from the exterior of the casing. A resilient ball detent 38 is provided to ensure that the gear wheel 32 can be moved forwardly step by step.

In order to illuminate the numbers 35 of the registering device a battery 39 is mounted in the casing and energizes a bulb 40.

A switch 41 having a movable contact arm which is actuated by the teeth of the gear wheel 32 is connected with the circuits for operating the slide changing and magazine feeding mechanisms. This connection is made through a cable 42 which connects the control box to the projector. The switch 41 provides for a change of slides when it is closed for a short period of time under the action of a tooth on the gear wheel 32.

A further switch 43 having movable contact arms is mounted in the casing and is actuated by a slidably mounted handle 44 for reversing the mechanism in the projector to correspond to a forward or reverse movement of the slide magazine.

The operation of this modification is basically similar to that of the first described embodiment of this invention and is readily apparent in view thereof.

It is therefore apparent that the use of such a counting and registering structure as provided above enables the operator to determine the precise position of the slide magazine in the projector. It is therefore possible to anticipate each slide which is to be shown and the correct comments and explanations can be prepared immediately prior to the projection of a particular slide. Further, the present invention facilitates the locating of a particular slide and is extremely helpful in locating a certain slide in a slide magazine wherein the slide magazine can be advanced a plurality of spaces in either direction. Thus it is not necessary for the operator to determine the precise number of slides between the slide being projected and the slide several compartments away which he desires to project next.

It will be understood that this invention is susceptible to modification in order to adapt it to different usages and conditions and, accordingly, it is desired to comprehend such modifications within this invention as may fall within the scope of the appended claims.

What is claimed as this invention is:

1. A remotely located control switch for slide projectors comprising: a casing, a geared counter having a scale disc in said casing, switching means mounted in said casing and operable from the exterior thereof to energize a circuit for actuating a slide changing mechanism, said switching means having a first and second spring biased pawl engaging said geared counted and a cam surface in said casing engaging said pawls so that said geared counter is rotated one step for each actuation of said switch member, said scale disc having a series of numerals corresponding to a series of slides to be projected, and a viewing window in said casing opposite said scale disc viewing one of said numerals to deterimne how many steps said counter is separated from a reference position.

2. A remotely located control switch for slide projectors comprising: a casing, a counter having a scale disc in said casing, switching means mounted in said casing and operable from the exterior thereof, means for normally maintaining said switching means in an inoperative position, a first circuit contact in said casing for actuating a slide changing mechanism, a second circuit contact actuating a slide changing mechanism in a reverse direction, means on said switching means actuating said contacts only when said switching means is being moved out of its inoperative position, means operatively connecting said switching means to said counter so that moving said switching means temporarily from inoperative to operating position will simultaneously operate said counter whereby each switch operation is registered by said counter, said scale disc having a series of numerals corresponding to a series of slides to be projected, and a viewing window in said casing opposite said scale disc viewing one of said numerals to determine how many steps said counter is separated from a reference position.

3. The control switch for slide projectors defined in claim 2, wherein illuminating means is contained in said casing to facilitate reading said numerals.

4. The control switch for slide projectors defined in claim 3, wherein a battery is contained in said casing for energizing said illuminating means.

5. The control switch for slide projectors defined in claim 2, wherein said numerals are luminescent.

6. The control switch for slide projectors defined in claim 2, wherein a cylindrical lens is mounted on said viewing window to facilitate the reading of said numerals.

7. A remotely located control switch for slide projectors comprising: a casing, a geared counted having a scale disc in said casing, switching means rotatively mounted in said casing and operable from the exterior thereof, means normally maintaining said switching means in an inoperative position, a first circuit contact in said casing actuating a slide changing mechanism, a second circuit contact actuating a slide changing mechanism in a reversed direction, a first switching element on said switching means actuating said first circuit contact, a second switching element on said switching means actuating said second circuit contact, said switching means having a first and second spring biased pawl engaging said geared counter and a cam surface in said casing engaging said pawls so that said geared counter is rotated one step for each actuation of said switch member, said scale disc having a series of numerals corresponding to a series of slides to be projected, and a viewing window in said casing opposite said scale disc viewing one of said numerals to determine how many steps said counter is separated from a reference position.

8. The control switch for slide projectors defined in claim 7, wherein said second switching element comprises a pivotally mounted lever having a slot, a pin movably mounted in said slot, said pin connected to an arm, said arm forming a rigid rotating part of said switch member.

References Cited by the Examiner
UNITED STATES PATENTS

| | | | |
|---|---|---|---|
| 775,055 | 11/04 | Waterman | 200—64 |
| 2,594,162 | 4/52 | Hartley | 88—28 |
| 2,815,444 | 12/57 | Messner | 325—393 |
| 2,969,441 | 1/61 | Showalter | 200—167 |

BERNARD A. GILHEANY, *Primary Examiner.*
ROBERT K. SCHAEFER, *Examiner.*